M. F. BISHOP.
HOT WATER HEATING DEVICE.
APPLICATION FILED AUG. 18, 1910.

979,415.

Patented Dec. 27, 1910.

WITNESSES:
T. C. Penfield.
M. O. Lougdeer

INVENTOR
Mary F. Bishop.
BY
ATTORNEY

UNITED STATES PATENT OFFICE.

MARY F. BISHOP, OF BOSTON, MASSACHUSETTS.

HOT-WATER HEATING DEVICE.

979,415.

Specification of Letters Patent. Patented Dec. 27, 1910.

Application filed August 18, 1910. Serial No. 577,863.

*To all whom it may concern:*

Be it known that I, MARY F. BISHOP, a citizen of the United States, residing in the city of Boston, county of Suffolk, and State of Massachusetts, have invented certain new and useful Improvements in Hot-Water Heating Devices; and I do declare the following to be a full, clear, and exact description of the invention, such as will enable others skilled in the art to which it appertains to make and use the same.

My invention relates to certain new and useful improvements in hot water heating devices, and has for its object to provide a device of this description which is readily adapted for use and in which the hot water is accessible without any danger of spilling or scalding the user, a further object of my invention being to preserve a maximum heat in the heating drum and to completely inclose the water drawer while at the same time access to the latter is had without removing the same from the heating drum.

With these ends in view my invention consists in the combination and arrangement of parts hereinafter fully set forth and then particularly pointed out in the claims which conclude this description.

Figure 1:
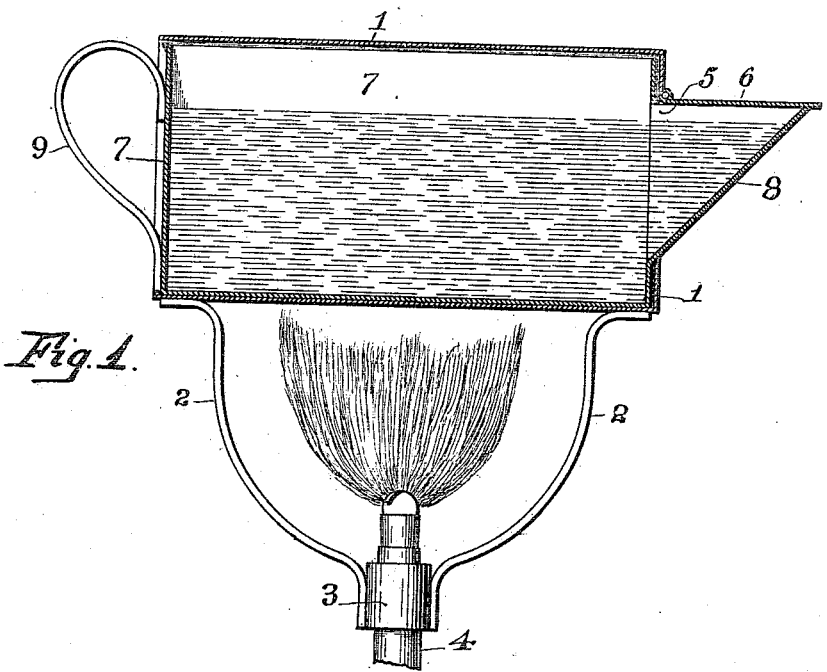
Figure 2:
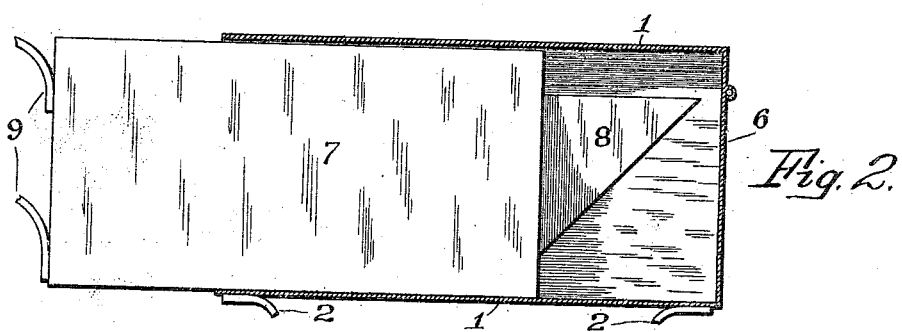
Figure 3:
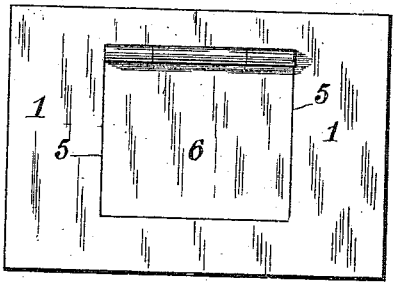
Figure 4:
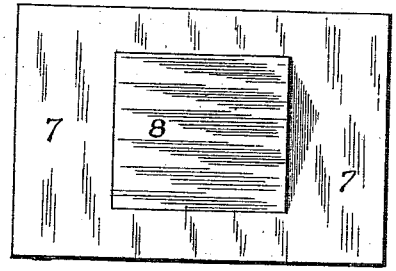

In the accompanying drawing Figure 1 is a sectional elevation showing the parts of my improvement in completely assembled condition over a suitable heating agent, Fig. 2 a sectional elevation showing the position of parts when the water drawer is partly inserted within the drum, Fig. 3 an end view of the drum, and Fig. 4 an end view of the drawer.

Similar numerals of reference denote like parts in the several figures of the drawing.

My present construction is an improvement upon the construction shown and described in Letters Patent No. 514,437, issued to me February 13, 1894, and will be best understood from the following description:—

1 is the heating drum made of metal and having any suitable bracket 2 soldered or otherwise secured to the bottom and provided with a socket 3 for ready attachment over a gas burner 4, and in this connection I would say that my improvement may be utilized in connection with any heating agent whether gas, electricity or a lamp. The farther end of the drum is provided with an opening 5 which is normally closed by means of a door 6 hinged to the upper edge of the opening which door operates by gravity.

7 is the hot water drawer whose main body portion may be either open or closed, and from the farther end of this drawer extends a spout 8 which is open at the top so that access may be readily had therethrough to the water within the drawer, the latter being provided at its rear end with any suitable handle 9.

When the drawer is inserted within the heating drum the spout will strike against the door 6 and open the same, and after the spout has been projected beyond the drum this door will lie flat against the top thereof so as to close said spout and thereby prevent impurities and foreign matter generally from contaminating the water contained within the drawer. When the drawer is withdrawn the door will automatically drop to closed position, thus preventing the air from circulating through the drum so as to cool the latter. The water may be poured within the drawer either before or after the same has been inserted within the drum, and the air within the latter may be heated before the drawer is inserted therein.

By lifting the door 6 articles used in the toilet may be readily inserted within the water in the drawer without removing the latter from the drum, and any steam generated will pass out into the air between the spout and the door thus rendering it unnecessary to provide any special vent.

The shapes of the drum or drawer are immaterial, and my invention is not limited thereby.

I claim:—

1. A hot water heating device, comprising, in combination with a drum having one end completely open and its opposite end partially open, a gravity door closing said last named opening, and a water drawer having a spout at one end, said spout having an open top, said drawer being insertible in said drum and said spout being insertible through said partially open end of the drum, whereby when the drawer is being inserted in normal position within the drum said spout will move said door from its normal vertical position to a horizontal position, in which latter position it covers said opening at the top of the spout.

2. In a hot water heating device, a hollow drum having open ends, means for closing one of said ends and a water containing member having one end thereof adapted to extend through one of the open ends of the drum, said end of said water containing member being open at its top and when moved into normal position within the drum moving said closing means from its normal position in which it closes one end of the drum to a position in which it closes said open end of said water containing member.

3. In a hot water heating device, a drum having open ends, a pivoted door at one end of said drum, said door normally occupying a vertical position and being capable of being swung to a position on the outside of the drum, and a water containing element having one end thereof extended and formed with an opening so as to be disposed on the outside of the drum when said element occupies its normal position on the interior of the drum and when moved to said normal position said end engaging said door and moving same to a position on the outside of the drum to cover said opening of said extended end.

In testimony whereof I affix my signature in presence of two witnesses.

MARY F. BISHOP.

Witnesses:
 WILLIAM P. NEWMAN,
 ABE SIMON.